United States Patent [19]

Schuchardt

[11] Patent Number: 5,010,047

[45] Date of Patent: Apr. 23, 1991

[54] RECOVERY OF DOUBLE METAL CYANIDE COMPLEX CATALYST FROM A POLYMER

[75] Inventor: Jonathan L. Schuchardt, Exton, Pa.

[73] Assignee: Arco Chemical Technology, Inc., Wilmington, Del.

[21] Appl. No.: 315,662

[22] Filed: Feb. 27, 1989

[51] Int. Cl.$^5$ .................. B01J 27/32; B01J 38/68; C07C 41/03; C07C 43/11

[52] U.S. Cl. ................................. 502/24; 502/31; 568/618; 568/620; 568/621

[58] Field of Search .............. 502/24, 31; 568/621, 568/620, 618

[56] References Cited

U.S. PATENT DOCUMENTS

| | | | |
|---|---|---|---|
| 3,278,459 | 10/1966 | Herold | 528/412 |
| 3,582,491 | 6/1971 | Louvar et al. | 568/621 |
| 3,823,145 | 7/1974 | Louvar et al. | 568/621 |
| 3,829,505 | 8/1974 | Herold | 568/618 |
| 3,941,849 | 3/1976 | Herold et al. | 528/92 |
| 4,355,188 | 10/1982 | Herold et al. | 568/620 |
| 4,721,818 | 1/1988 | Harper et al. | 568/120 |
| 4,843,054 | 7/1989 | Harper | 502/175 |

OTHER PUBLICATIONS

Preparation of High Molecular Weight Polyols Using Double Metal Cyanide Catalysts (Schuchardt, Harper, SPI, Oct. 1989).

*Primary Examiner*—Paul E. Konopka
*Attorney, Agent, or Firm*—Stephen D. Harper

[57] ABSTRACT

A process for recovering double metal cyanide complex catalyst from a polymer such as polypropylene glycol in a form suitable for use as a polymerization catalyst is described. The process comprises the steps of (a) combining the polymer with a non-polar solvent to precipitate the catalyst and (b) filtering the resulting mixture in the presence of a filter aid to separate the polymer from the precipitated catalyst. In contrast to the prior art methods of catalyst removal, the process of the invention yields polymer uniformly low in color as well as recovered catalyst which may be reused in subsequent polymerizations.

16 Claims, No Drawings

RECOVERY OF DOUBLE METAL CYANIDE COMPLEX CATALYST FROM A POLYMER

This invention relates to the purification of a polymer product which has been prepared using a double metal cyanide complex compound as catalyst. More specifically, the invention pertains to the recovery of double metal cyanide complex compound catalyst from a polymer product in a form which can be readily used again in a subsequent polymerization.

BACKGROUND OF THE INVENTION

Double metal cyanide compounds are known to be extremely active catalysts for the polymerization of epoxides, as disclosed for example in U.S. Pat. No. 3,278,457. They have also been employed in copolymerizations of epoxides and other monomers such as cyclic anhydrides and carbon dioxide (U.S. Pat. Nos. 3,438,043 and 4,500,704). Such catalysts have been found to be particularly useful for the preparation of polyether polyols, as taught by U.S. Pat. No. 3,829,505. Polyether polyols produced in this manner have lower levels of unsaturation and hence higher average actual hydroxyl functionality than polyols obtained using conventional base-catalyzed methods. Polyether polyols are commercially employed in a wide variety of applications, including polyurethane foams and elastomers.

In spite of the high activity of the double metal cyanide complex catalysts, which allows such catalysts to be used at relatively low concentrations, the prior art has recognized that it is desirable to remove as much of the catalyst as possible from the polymer following polymerization U.S. Pat. No. 4,355,188 teaches that the residual catalyst catalyzes allophanate formation when a polyether polyol is reacted with an isocyanate and also promotes the formation of undesirable volatile by-products during storage.

However, removal of the catalyst is complicated by its solubility in the polymer. U.S. Pat. No. 3,829,505 (col. 6, lines 17-21) teaches that the double metal cyanide complex catalyst, while initially insoluble in the polymerization medium, becomes very well dispersed if not completely dissolved during the polymerization process. In addition, this reference teaches that dilution of the polymer product in a non-viscous solvent, followed by centrifugation, is ineffective in removing a major proportion of the catalyst. Thus, the methods which have been developed in the prior art to effectively remove double metal cyanide complex catalyst from a polymer all involve some type of chemical treatment of the polymer product.

U.S. Pat. No. 4,344,188 teaches that removal of the residual catalyst may be accomplished by treating the crude polymer with a strong base such as an alkali metal hydroxide or alkali metal dispersion and then passing the polymer through an anionic exchange resin.

U.S. Pat. No. 4.721,818 teaches that catalyst removal is achieved by reacting the polymer with an alkali metal hydride so as to convert the double metal cyanide complex catalyst into an insoluble species which can then be removed by filtration. An adsorbent such as magnesium silicate may be employed to remove any excess alkali metal hydride remaining.

SUMMARY OF THE INVENTION

The present invention provides a method for recovering a double metal cyanide complex catalyst from a polymer in a form suitable for use as a polymerization catalyst, comprising the steps of (a) forming a mixture of a double metal cyanide complex catalyst-containing polymer product and an amount of a non-polar solvent effective to precipitate the double metal cyanide complex catalyst; and (b) filtering the mixture in the presence of a filter aid which is suspended in the mixture in an amount effective to accomplish separation of the precipitated double metal cyanide complex catalyst from the polymer product. In a subsequent step, the recovered double metal cyanide complex catalyst may be used as a polymerization catalyst.

In contrast to the methods of the prior art requiring the use of chemical reagents such as strong base, which may result in undesired increases in polymer color and the introduction of alkali metal contaminants, the process of the present invention is simple, rapid, and uses relatively mild conditions to achieve substantially complete catalyst removal. The color of the treated polymer remains low, while the non-polar solvent and filter-aid which are introduced are easily removed from the polymer. The novel process of this invention is particularly well-suited for the removal of double metal cyanide complex catalyst from propylene oxide polyols. For reasons which are not well understood, it has been found that catalyst removal using any of the prior art methods is much less reliable when the polymer being treated is a propylene oxide homopolymer rather than an ethylene oxide-capped propylene oxide polyol.

In addition, the nature of the double metal cyanide complex catalyst is apparently not substantially changed by the recovery process of this invention and the recovered catalyst may be readily reused in subsequent polymerizations. This, of course, offers a significant commercial advantage since the double metal cyanide complex catalysts are relatively expensive compared to the potassium hydroxide catalyst currently used by the chemical industry to produce polyether polyols. The prior art methods for catalyst removal result in complete deactivation of the double metal cyanide complex catalyst due to the harsh reagents and conditions employed. No method is currently available to reactivate or reuse catalysts removed by these prior art procedures.

DETAILED DESCRIPTION OF THE INVENTION

Any polymer product prepared using a double metal cyanide complex catalyst can be purified according to the process of this invention. Suitable polymers include, but are not limited to, epoxide polymers (polyethers), epoxide/anhydride copolymers (polyesters), and epoxide/carbon dioxide copolymers (polyalkylene carbonates). The process of this invention may be used with polymers of any molecular weight, although it is preferred that the polymer be substantially soluble in the non-polar solvent employed. Polyether polyols, that is, epoxide polymers of low to medium molecular weight and having at least one terminal hydroxyl group per polymer chain, are particularly suitable. Examples of suitable polyether polyols include propylene oxide polyols and random ethylene oxide/propylene oxide polyols having number average molecular weights between about 500 and 20,000. Typically, polyether polyols of this type will be either diols or triols, although the functionality may be further varied depending on the end-use application.

Polyether polyols suitable for purification by the process of this invention may be prepared using double metal cyanide complex catalysts by any of the methods known in the art, including the methods described in U.S. Pat. Nos. 3,404,109, 3,829,505, 3,900,518 and 3,941,849. The teachings of these patents are incorporated herein by reference. Typically, such polyether polyols are prepared by polymerization of an epoxide or mixture of epoxides in the presence of a double metal cyanide complex catalyst and an initiator having at least one hydroxyl or other active hydrogen group. The relative amount of initiator used controls the final molecular weight of the polyether polyol. If no initiator is used, very high molecular weight polyethers will be obtained. Such high molecular weight polyethers may also be treated to remove the double metal cyanide complex catalyst in accordance with the process of this invention.

Any suitable epoxide may be employed. Suitable epoxides include propylene oxide, ethylene oxide, and 1,2-butylene oxide, or mixtures thereof. Examples of suitable initiators include trihydroxy compounds such as trimethylol propane, glycerin, and their alkoxylated derivatives, dihydroxy compounds such as ethylene glycol, propylene glycol, and their low molecular weight oligomers such as tripropylene glycol, monohydroxy compounds such as methanol, ethanol, and allyl alcohol, as well as amines, water, and enolizable ketones such as acetone. The polymerization may be carried out in a suitable solvent; ethers such as tetrahydrofuran are particularly preferred.

Any suitable double metal cyanide complex catalyst may also be used. Such catalysts may be prepared by several methods. The composition of the catalyst affects the polymerization activity and may be varied considerably by changing starting reagents and the method of preparation and purification. Catalysts particularly well suited for the preparation of propylene oxide polyols of low polydispersity and unsaturation include zinc hexacyanocobaltate complex catalysts having the general formula:

$$Zn_3[Co(CN)_6]_2 \cdot xZnCl_2 \cdot y \text{ glyme} \cdot z H_2O$$

wherein x, y and z will vary depending on the exact method of preparation.

The preparation of double metal cyanide complex catalysts suitable for use in the polymerization of epoxides and other monomers is described in detail in U.S. Pat. Nos. 4,472,560 and 4,477,589 to Shell Chemical Company and U.S. Pat. Nos. 3,427,256, 3,427,334 and 3,427,335 to General Tire and Rubber. The teachings of the foregoing patents are incorporated herein by reference.

The exact form and structure of the double metal cyanide complex catalyst once polymerization is completed is not known. The catalyst is not active when first contacted with epoxide or other monomers and typically exhibits an initiation or induction period during which little or no epoxide conversion takes place. Immediately following activation, little, if any, of the catalyst cannot be removed by conventional filtration. However, as further epoxide conversion occurs and the polymer molecular weight increases, a significant portion of the catalyst becomes "dissolved" in the polymer, and cannot be removed by filtration of the untreated polymerization mixture. The process of this invention facilitates the removal of substantially all of the residual double metal cyanide complex catalyst, as is demonstrated by the examples provided.

In the process of the present invention, the polymer containing the solubilized double metal cyanide complex catalyst is combined with non-polar solvent in an amount sufficient to precipitate the catalyst. Preferably, at least about 0.5 parts of the non-polar solvent per part of polymer are employed in order to achieve more rapid and complete catalyst precipitation.

The minimum amount of non-polar solvent required to effect catalyst removal will be dependent on a number of variables, including the particular solvent used, catalyst concentration, polymer composition and molecular weight, and temperature. Besides serving to precipitate the solubilized double metal cyanide complex catalyst, addition of the non-polar solvent dilutes the polymer and decreases its viscosity, thereby facilitating the subsequent filtration step in which the catalyst is separated from the polymer.

The term non-polar is meant to indicate that the solvent is a poor solvent for polar substances and has a relatively low dielectric constant. In general, the dielectric constant of the non-polar solvent should be lower than the dielectric constant of the polymer being treated in order to accomplish substantially complete precipitation of the solubilized double metal complex catalyst. It is also desirable that the polymer be substantially soluble in the non-polar solvent. Preferably, the non-polar solvent should have a boiling point at atmospheric pressure of between about 25° C. and 150° C. so that elaborate equipment such as a pressure vessel or a high vacuum pump is not needed during processing of the polymer. If the recovered catalyst is to be used in a subsequent polymerization, it is preferred that the non-polar solvent be inert and not deactivate the catalyst. It is known that compounds having either functional groups which are strong Lewis bases (tertiary amines, for example) or easily ionizable carbon-halogen bonds tend to deactivate double metal cyanide complex catalysts.

General classes of non-polar solvents suitable for use in the process of this invention include, but are not limited to, straight chain alkanes, branched alkanes, cyclic alkanes, unsubstituted aromatic hydrocarbons, and alkyl-substituted aromatic hydrocarbons. Specific examples of suitable non-polar solvents include pentane, hexane, heptane, octane, cyclohexane, benzene, toluene, ethylbenzene, and o-, m-, or p-xylene. Mixtures of non-polar solvents may also be used. Petroleum ether, a mixture of principally $C_5$ and $C_6$ alkanes, and hexanes, a mixture of principally $C_6$ alkanes, are examples of suitable non-polar solvent mixtures.

It is known that the use of certain relatively polar solvents such as tetrahydrofuran and glyme in the polymerization of epoxides using double metal cyanide complex catalysts can have certain beneficial results, including the reduction of unsaturation levels in the resulting polyether polyol. Typically, approximately 10 to 50 parts by weight of the polar solvent will be present in the final polymer product. The removal of the polar solvent prior to addition of the non-polar solvent is not necessary to accomplish catalyst removal by the process of the invention, although a somewhat larger amount of non-polar solvent may be required than if the polar solvent was not present.

A filter aid is additionally combined with the mixture of non-polar solvent and polymer in the process of this invention. The filter aid assists in the separation of the polymer from the precipitated double metal cyanide catalyst, which generally is in the form of very small particles. The order in which these components are combined is not critical. The filter aid is suspended in the mixture prior to or during filtration. Suitable filter aids are those materials known in the art to facilitate the removal of finely divided solids from liquids, including perlite, Fuller's earth, cellulose fiber, and, most preferably, diatomaceous earth. An example of a suitable diatomaceous earth filter-aid is Standard SuperCel®, sold commercially by Johns-Manville. If the recovered catalyst is to be used in a subsequent polymerization, the filter aid chosen should be inert so that it does not interfere with the polymerization. It is preferred that at least about 0.0005 parts by weight of filter aid per part by weight of polymer be used. Catalyst removal is most effective when from 0.01 to 0.10 parts of the filter aid per part of polymer are employed. The effectiveness of catalyst removal is generally enhanced by stirring the mixture of non-polar solvent, polymer, and filter aid for at least about 15 minutes before filtering. Temperatures around room temperature (25° C.) are usually satisfactory, although higher or lower temperatures may also be employed.

Following addition of the non-polar solvent and filter aid to the polymer, the precipitated double metal cyanide complex catalyst is separated from the non-polar solvent and polymer. At the same time, of course, that portion of the double metal cyanide complex catalyst which was initially not dissolved in the polymer will also be removed. This separation may be accomplished by filtration or other methods such as centrifugation as may be known in the art for separating finely divided solids from a liquid medium. Any conventional method of filtration may be employed; filtration through a pad of additional filter aid or recycle of the filtrate through the filter cake are techniques which can be employed to enhance catalyst removal.

Following filtration of the polymer/non-polar solvent mixture, the resulting filter cake containing the precipitated double metal cyanide complex catalyst and filter aid may be washed with additional non-polar solvent to remove any residual polymer. The recovered double metal cyanide complex catalyst may then be directly employed as catalyst in a subsequent polymerization in the same manner as the original fresh catalyst. The quantity of filter cake used as catalyst in a subsequent polymerization must, of course, be adjusted to compensate for the proportion of double metal cyanide complex catalyst actually present. A mixture of fresh catalyst and recovered catalyst may be used.

The filtrate may then be treated in any manner known in the art to remove a volatile solvent from a polymer, including distillation, vacuum stripping, or the use of a wiped film evaporator. Solvent removal is normally desirable in the preparation of polyether polyols suitable for use in polyurethanes. The solvent which is removed may, if desired, be recycled for use in subsequent batches. A polyether polyol obtained in this manner may be reacted with ethylene oxide and an alkali metal catalyst to form an EO-capped polyether polyol having reactive primary hydroxyl end-groups.

The following examples are meant to illustrate, but not limit, the invention.

GENERAL EXPERIMENTAL

The polymer products treated in Examples 1-23 (Polyols A, B, and C) were propylene oxide triols of about 8,000 number average molecular weight containing about 10 weight percent tetrahydrofuran and about 500 ppm zinc hexacyanocobaltate/zinc chloride/glyme/water catalyst. The concentrations of zinc and cobalt in the untreated polyols were approximately 110 and 50 ppm respectively. The crude polyols were prepared in accordance with the teachings of U.S. Pat. No. 3,829,505. The treated polyols were stripped of solvent under vacuum before being analyzed for cobalt and zinc.

EXAMPLES 1-4

Polyols A and B were combined with approximately 0.05-0.06 parts by weight Standard SuperCel® (product of Johns-Manville) and either 1 or 2 parts by volume hexanes (b.p. 68°-70° C.) per part by weight of polyol. After stirring 1 hr. at 25°, the mixtures were vacuum filtered through a thin pad of Standard SuperCel® in a fritted glass filter. In each case, the levels of residual zinc and cobalt in the polyol were reduced to 2 ppm or less (Table I).

EXAMPLES 5-8

Polyols A and B were combined with approximately 0.05-0.06 parts by weight Standard SuperCel® and either 1 or 2 parts by volume of hexanes per part by weight of polyol. After standing overnight at 25° C., the mixtures were vacuum filtered through a thin pad of Standard SuperCel® in a fritted glass filter. In each case, the levels of residual zinc and cobalt in the polyol were reduced to 8 ppm or less, indicating that substantially complete catalyst removal had been achieved (Table I).

EXAMPLES 9-12

To demonstrate that pre-filtration of the polyols prior to combining with the non-polar solvent may be beneficial, Polyols A and B were filtered through a thin pad of Standard SuperCel® prior to diluting with a non-polar solvent. The pre-filtered polyols were then treated with hexanes and filtered as described for examples 5-8, yielding products with levels of catalyst which were lower than those observed without prefiltration (Table I).

EXAMPLES 13-16

To demonstrate that the length of time during which the mixture of non-polar solvent, polymer, and filter aid are stirred prior to filtration is not critical, samples of polyol B were diluted 1:1 with hexanes, treated with Standard SuperCel®, and stirred at ambient temperature for the time indicated in Table II before filtering through a thin pad of Standard SuperCel®. Catalyst removal in each case was satisfactory.

EXAMPLES 17-21

These examples show the importance of using a non-polar solvent in the process of this invention. Samples of Polyol B were diluted 2:1 with the solvent shown in Table III, stirred 1 hour at ambient temperature with Standard SuperCel®, and then filtered through thin pads of Standard SuperCel®. Effective catalyst removal was accomplished only when non-polar solvents (hexanes, toluene, heptane) were used.

COMPARATIVE EXAMPLE 22

To demonstrate that filter aid must be suspended in the mixture of polyol and non-polar solvent prior to or during filtration to achieve substantially complete catalyst removal, Polyol C was combined with 2 parts by volume of hexanes per part by weight of polyol at 25° C., and then filtered through a thin pad of Standard SuperCel ®. Considerable amounts of zinc (40 ppm) and cobalt (19 ppm) were still present in the filtered polyol (Table I).

COMPARATIVE EXAMPLE 23

To demonstrate that non-polar solvent must be combined with the polyol and filter aid to achieve substantially complete catalyst removal, Polyol B was treated with approx. 0.05-0.06 parts by weight of Standard SuperCel ® per part of polyol. After stirring 1 hour at 25° C., the mixture was vacuum filtered through a thin pad of Standard SuperCel ®. Considerable amounts of zinc (43 ppm) and cobalt (21 ppm) were still present in the filtered polyol (Table I).

EXAMPLE 24

To demonstrate that the double metal cyanide catalyst can be recovered and recycled by the process of this invention, poly(propylene oxide) triols D and E were prepared as follows:

An autoclave reactor was charged with propylene oxide (25 parts), tetrahydrofuran (80 parts), 450 mol. wt. propoxylated glycerin triol (25.8 parts) and zinc hexacyanocobaltate (0.28 parts). The mixture was heated to 90° C. with agitation. The catalyst became active within one hour, and the remaining propylene oxide (635 parts) was added over 8 hours. The product was drained from the reactor and combined with filter aid (Standard SuperCel ®, 16 parts) and hexanes (660 parts). The mixture was stirred well, filtered through a thin pad of filter aid, and refiltered once through the same cake. The polyol product (Polyol D) was stripped of solvent and analyzed (Table IV).

The filter cake was rinsed well with hexanes and returned to the reactor. A second batch of poly(propylene oxide) triol was prepared in a manner similar to the first batch from 450 mol. wt. propoxylated glycerin triol (25.8 parts), recycled catalyst, and propylene oxide (450 g total). The resulting product was isolated as above (Polyol E, Table IV). Quantitative epoxide conversion was observed. The molecular weight found (as determined by hydroxyl number) was very close to the molecular weight expected from the amount of propylene oxide and initiator used. The recovered catalyst thus performed satisfactorily as a polymerization catalyst.

TABLE I

| Example | 1 | 2 | 3 | 4 | 5 | 6 | 7 | 8 | 9 | 10 | 11 | 12 | 22* | 23* |
|---|---|---|---|---|---|---|---|---|---|---|---|---|---|---|
| Polyol | A | A | B | B | A | A | B | B | A | A | B | B | C | A |
| Prefiltered | No | No | No | No | No | No | No | No | Yes | Yes | Yes | Yes | No | Yes |
| Solvent | Hexanes | → | → | → | → | → | → | → | → | → | → | → | → | NONE |
| Parts Solvent / Parts Polyol | 1 | 2 | 1 | 2 | 1 | 2 | 1 | 2 | 1 | 2 | 1 | 2 | 2 | 0 |
| Filter Aid | Yes | Yes | Yes | Yes | Yes | Yes | Yes | Yes | Yes | Yes | Yes | Yes | No | Yes |
| Final Zn, ppm | <2 | <2 | <2 | <2 | 4 | 4 | 8 | 7 | 3 | <2 | <2 | <2 | 40 | 43 |
| Final Co, ppm | 2 | <2 | 2 | <2 | 4 | 3 | 5 | 5 | 3 | 2 | <2 | <2 | 19 | 21 |

*comparative examples

TABLE II

| | Example | | | |
|---|---|---|---|---|
| | 13 | 14 | 15 | 16 |
| Time Stirred, hr. | 1.0 | 0.75 | 0.50 | 0.25 |
| Final Zn, ppm | 6.0 | 6.7 | 6.8 | 9.5 |
| Final Co, ppm | 3.0 | 2.8 | 3.1 | 3.7 |

TABLE III

| | Example | | | | |
|---|---|---|---|---|---|
| | 17 | 18 | 19* | 20 | 21* |
| Solvent | hexanes | toluene | THF | heptane | $CH_2Cl_2$ |
| Dielectric Constant of Solvent | 1.9 | 2.4 | 7.6 | 1.9 | 9.1 |
| Final Zn, ppm | 5.1 | 2.9 | 81 | <2 | 83 |
| Final Co, ppm | 3.0 | <2 | 29 | <2 | 40 |

*comparative examples

TABLE IV

| Polyol | g Polyol expected | g Polyol found | Polyol % yield | GPC Mn | GPC Mw/Mn | Calc. mol wt[1] | OH # mol wt[2] |
|---|---|---|---|---|---|---|---|
| D | 694 | 712 | 100 | 10,420 | 1.39 | 12,108 | 12,031 |
| E | 484 | 487 | 100 | 6,480 | 1.46 | 8,485 | 8,232 |

[1] based on weights of propylene oxide and initiator used

[2] $= \dfrac{56.1 \times \text{Polyol Functionality} \times 1000}{\text{Hydroxyl Number (meq/g)}}$

I claim:

1. A process for recovering a double metal cyanide complex catalyst from a polymer product having a number average molecular weight of from about 500 to about 20,000 and selected from the group consisting of epoxide polymers, epoxide/anhydride copolymers, and epoxide/carbon dioxide copolymers, in a form suitable for use as a polymerization catalyst which comprises the steps of:
    (a) dissolving a double metal cyanide complex catalyst-containing polymer product in an amount of a non-polar solvent having a dielectric constant lower than the dielectric constant of the polymer product effective to precipitate the double metal cyanide complex catalyst; and
    (b) filtering the resulting polymer solution in the presence of a filter aid which is suspended in the solution in an amount effective to accomplish separation of the precipitated double metal cyanide complex catalyst from the polymer product.

2. The process of claim 1 comprising the additional step before step (a) of filtering the double metal cyanide complex catalyst-containing polymer product.

3. The process of claim 1 comprising the additional step after step(b) of separating the non-polar solvent from the polymer product.

4. The process of claim 1 wherein the double metal cyanide complex catalyst is a zinc hexacyanocobaltate complex catalyst.

5. The process of claim 1 wherein the polymer product is an epoxide polymer.

6. The process of claim 1 wherein the polymer product is a polymer of propylene oxide.

7. The process of claim 1 wherein the polymer product is a propylene oxide polyol.

8. The process of claim 1 wherein the non-polar solvent is selected from the group consisting of straight chain alkanes, branched alkanes, cyclic alkanes, unsubstituted aromatic hydrocarbons, alkyl-substituted aromatic hydrocarbons, and mixtures thereof.

9. The process of claim 1 wherein the filter aid is a diatomaceous earth filter aid.

10. The process of claim 1 wherein the polymer product contains a polar solvent.

11. A process for recovering a zinc hexacyanocobaltate complex catalyst from a polyether polyol product having a number average molecular weight of from about 500 to about 20,000 in a form suitable for use as an epoxide polymerization catalyst which comprises the steps of:

(a) dissolving a zinc hexacyanocobaltate complex catalyst-containing polyether polyol product in an amount of a non-polar solvent effective to precipitate the zinc hexacyanocobaltate complex catalyst, said non-polar solvent being selected from the group consisting of straight chain alkanes, cyclic alkanes, branched alkanes, unsubstituted aromatic hydrocarbons, and alkyl-substituted aromatic hydrocarbons; and (b) filtering the resulting polymer solution in the presence of a diatomaceous earth filter aid which is suspended in the solution in an amount effective to accomplish separation of the precipitated zinc hexacyanocobaltate complex catalyst from the polyether polyol product.

12. The process of claim 11 comprising the additional step before step (a) of filtering the zinc hexacyanocobaltate-containing polyether polyol product.

13. The process of claim 11 wherein the polyether polyol product is a propylene oxide polymer.

14. The process of claim 11 wherein the non-polar solvent is selected from the group consisting of pentane, hexane, heptane, octane, cyclohexane, petroleum ether, hexanes, and mixtures thereof.

15. The process of claim 11 wherein the non-polar solvent is selected from the group consisting of benzene, toluene, o-xylene, m-xylene, p-xylene, ethyl benzene, and mixtures thereof.

16. The process of claim 11 wherein the polyether polyol product contains a polar solvent.

* * * * *